(12) United States Patent
Papagrigoriou (10) Patent No.: US 9,396,468 B2
(45) Date of Patent: Jul. 19, 2016

(54) APPARATUS FOR SECURING ELECTRONIC TRANSACTIONS USING SECURE ELECTRONIC SIGNATURES (71) Applicant: Paschalis Papagrigoriou, Nuremberg (DE)

(72) Inventor: Paschalis Papagrigoriou, Nuremberg (DE)

( * ) Notice: Subject to any disclaimer, the term of this patent is extended or adjusted under 35 U.S.C. 154(b) by 506 days.

(21) Appl. No.: 14/024,408

(22) Filed: Sep. 11, 2013

(65) Prior Publication Data

US 2014/0081872 A1    Mar. 20, 2014

(30) Foreign Application Priority Data

Sep. 14, 2012  (DE) .................. 10 2012 108 645

(51) Int. Cl.
*G06K 19/00*    (2006.01)
*G06Q 20/38*    (2012.01)
*G06Q 20/32*    (2012.01)
*G06Q 20/34*    (2012.01)
*G07F 7/08*    (2006.01)

(52) U.S. Cl.
CPC .......... *G06Q 20/3825* (2013.01); *G06Q 20/327* (2013.01); *G06Q 20/3415* (2013.01); *G06Q 20/353* (2013.01); *G06Q 20/3563* (2013.01); *G06Q 20/382* (2013.01); *G07F 7/0846* (2013.01); *G07F 7/0893* (2013.01)

(58) Field of Classification Search
USPC ...................................... 235/380, 492; 705/41
See application file for complete search history.

(56) References Cited

U.S. PATENT DOCUMENTS

2008/0245851 A1* 10/2008 Kowalski ........... G06K 7/10178
                                                             235/375
2009/0199006 A1     8/2009 Stohn
2010/0049988 A1*  2/2010 Birman .................. G06F 21/62
                                                             713/189

FOREIGN PATENT DOCUMENTS

| DE | 10 2007 050463 A1 | 5/2008 |
| DE | 10 2008 007 367 B4 | 9/2010 |
| EP | 1 855 231 A1 | 11/2007 |
| EP | 2 088 531 A1 | 8/2009 |
| EP | 2122587 A2 | 11/2009 |
| WO | 2008058741 A2 | 5/2008 |

OTHER PUBLICATIONS

Wikipedia, Near Field Communication, http://de.wikipedia.org/wiki/Near_Field_Communication (8 pp.).
Wikipedia, Near Field Communication, http://en.wikipedia.org/wiki/Near_Field_Communication (12 pp.).

(Continued)

*Primary Examiner* — Daniel Hess
(74) *Attorney, Agent, or Firm* — Cooley LLP (57) ABSTRACT

Chip card for an electronic transaction including a display, a keypad, a network interface, a processing unit, a microcontroller and a memory area for signature information and/or key information, characterised by a means which enables the chip card to connect to a host system via the network interface so as to appear to the host system as an integrated card reader with inserted chip card, whereby the transaction data relating to the chip card are received by the host system via the network interface for presentation on the display so that the transaction data can be confirmed by key input on the keypad, provided with the signature, and then sent to the PC.

14 Claims, 4 Drawing Sheets

(56) References Cited

OTHER PUBLICATIONS

Wikipedia, Bluetooth, http://de.wikipedia.org/wiki/Bluetooth#Aktueller_Standard:_Bluetooth_4.0 (10 pp.).
Wikipedia, Bluetooth, http://en.wikipedia.org/wiki/Bluetooth#Aktueller_Standard:_Bluetooth_4.0 (20 pp.).
Wikipedia, Kartenlesegerlit, http://de.wikipedia.org/wiki/Kartenlesegerät (4 pp.).
Wikipedia, ISO/IEC 7810, http://en.wikipedia.org/wiki/ISO/IEC_7810 (3 pp.).
Wikipedia, ISO/IEC 7816, http://en.wikipedia.org/wiki/ISO/IEC_7816 (6 pp.).
Wikipedia, ISO/IEC 14443, http://en.wikipedia.org/wiki/ISO/IEC_14443 (3 pp.).
SRC Security Research & Consulting, Secoder—Connected Mode Reader Applications, May 8, 2011, Ver. 2.2 (134 pp.).
PS/SC Workgroup, Interoperability Specification for ICCs and Personal Computer Systems, Addendum—References, Mar. 2010, Ver. 2.00.00 (15 pp.).
PS/SC Workgroup, Interoperability Specification for ICCs and Personal Computer Systems, Part 1. Introduction and Architecture Overview, Sep. 2005, Ver. 2.01.01 (30 pp.).
PS/SC Workgroup, Interoperability Specification for ICCs and Personal Computer Systems, Part 2. Interface Requirements for Compatible IC Cards and Readers, Sep. 2005, Ver. 2.01.01 (16 pp.).
PS/SC Workgroup, Interoperability Specification for ICCs and Personal Computer Systems, Part 3. Requirements for PC-Connected Interface Devices, Jun. 2007, Ver. 2.01.09 (49 pp.).
PS/SC Workgroup, Interoperability Specification for ICCs and Personal Computer Systems, Part 3. Requirements for PC-Connected Interface Devices, Amendment 1, Jun. 3, 2011 [Jun. 2007, Rev. 2.01.09] (8 pp.).
PS/SC Workgroup, Interoperability Specification for ICCs and Personal Computer Systems, Part 3. Supplemental Document, Jun. 2013 (8 pp.).
PS/SC Workgroup, Interoperability Specification for ICCs and Personal Computer Systems, Part 3. Supplemental Document for Contactless ICCs, Apr. 2010, Ver. 2.02.00 (37 pp.).
PS/SC Workgroup, Interoperability Specification for ICCs and Personal Computer Systems, Part 4. IFD Design Considerations and Reference Design Information, Sep. 2005, Ver. 2.01.01 (27 pp.).
PS/SC Workgroup, Interoperability Specification for ICCs and Personal Computer Systems, Part 5. ICC Resource Manager Definition, Sep. 2005, Ver. 2.01.01 (28 pp.).
PS/SC Workgroup, Interoperability Specification for ICCs and Personal Computer Systems, Part 6. ICC Service Provider Interface Definition, Sep. 2005, Ver. 2.01.01 (48 pp.).
PS/SC Workgroup, Interoperability Specification for ICCs and Personal Computer Systems, Part 7. Application Domain and Developer Design Considerations, Sep. 2005, Ver. 2.01.01 (18 pp.).
PS/SC Workgroup, Interoperability Specification for ICCs and Personal Computer Systems, Part 8. Recommendations for ICC Security and Privacy Devices, Sep. 2005, Ver. 2.01.01 (52 pp.).
PS/SC Workgroup, Interoperability Specification for ICCs and Personal Computer Systems, Part 9. IFDs with Extended Capabilities, Sep. 2005, Ver. 2.01.01 (27 pp.).
PS/SC Workgroup, Interoperability Specification for ICCs and Personal Computer Systems, Part 10. IFDs with Secure Pin Entry Capabilities Supplement—IFDs with Feature Capabilities, Nov. 2012, Ver. 2.02.01 (17 pp.).
PS/SC Workgroup, Interoperability Specification for ICCs and Personal Computer Systems, Part 10. IFDs with Secure Pin Entry Capabilities, Jun. 26, 2012, Amendment 1.1 [Rev. 2.02.08, Apr. 2010] (8 pp.).
PS/SC Workgroup, Interoperability Specification for ICCs and Personal Computer Systems, Part 10. IFDs with Secure PIN Entry Capabilities, Nov. 2012, Ver. 2.02.09 (35 pp.).
German Patent Office (Deutsches Patent- und Markenamt) Office Action dated Jun. 13, 2013 in Patent Application No. DE 10 2012 108 645.1 with English Translation (17 pp.).
European Search Report issued to patent application No. DE 10 2007 050463, dated Jan. 10, 2014 (5 pgs.).

\* cited by examiner

APPARATUS FOR SECURING ELECTRONIC TRANSACTIONS USING SECURE ELECTRONIC SIGNATURES

CROSS REFERENCE TO RELATED APPLICATIONS

This application claims priority from German Application No. 10 2012 108 645.1 filed Sep. 14, 2012, which is hereby incorporated by reference in its entirety.

TECHNICAL FIELD

The invention relates to an apparatus for signature-based securing of electronic transactions, particularly those performed by banking applications on personal mobile devices or other money/payment systems, requiring absolute integrity of the digitally-signed information and absolute identification of the originator of this information.

BACKGROUND

Electronic signatures are used whenever it is necessary to identify with certainty the creator or sender of an electronic document or record and to guarantee the integrity of the signed electronic information. An example of a security-critical field which is becoming increasingly important in daily life are banking applications such as home banking or mobile banking. It is immediately apparent what might happen if a malicious third party were able to masquerade as the holder of a bank account that does not belong to him.

With the adoption of mobile systems for personal and business use, as well as by health services and public authorities, the risks that arise if the integrity of the transmitted information cannot be guaranteed, or if the identity of its creator cannot be established beyond doubt, are multiplied.

Besides cost, an important criterion for the selection of an electronic security method is user-friendliness. While a security method may be secure, if it is complex it will very likely not be accepted by users, particularly private users, owing to lack of technical knowledge or because the method is awkward to use. In the case of mobile devices, it is certain that acceptance will also depend on whether additional equipment is required (e.g. card readers/chip-card reading units), with or without cables. Hence, existing solutions currently on the market, as listed and described in the "Prior Art" section below, cannot only be judged in terms of their security, but also need to be assessed in terms of their user-friendliness.

Security solutions have so far not been able to adapt adequately to the rapid developments in the field of mobile devices (smartphones, tablets etc.) In practice, some of the methods that can be used in combination with mobile devices have rather significant disadvantages for the user in terms of practicality or usability, making them unsuitable for widespread adoption. Conversely, the solution of the present invention meets the highest security requirements, yet it can be used with mobile devices in an optimal and user-friendly manner.

The prior art described below refers to methods from the fields of secure payments, online banking security and chip technology. The sheer number of security methods on the internet that have been developed in the last ten years is a testament to the importance of security and reliability for communication on the internet. Methods reliant on the use of TAN lists to secure a transaction are now no longer considered secure and have been superseded by other methods.

All serious security methods are now focussing on the chip card. The chip card is considered a secure carrier of key information, it is always in the customer's possession (part of their property), and has become for the user a valuable and secure medium that is to be closely looked after. Any loss is reported immediately to the issuer (e.g. the user's bank). A financial institution can therefore be confident that the chip card is in the customer's possession and the customer is the person actually executing the transactions, as a loss of the chip card would be immediately reported. The term smart card is also used as a synonym for chip card. We shall also refer to smart cards in this document, particularly in the context of chip card cryptographic microcontrollers, which are the actual modules that perform cryptographic operations.

In order to use a TAN (transaction authentication number) in a transaction, a so-called TAN generator is still frequently used today. The user requires an external device, which does not need to be subject to any particular security requirements, and his personal chip card.

In the second half of the last decade, the so-called indexed TAN method (iTAN method) promised increased security. In this method, the bank customer has to select a specific TAN from a list to confirm a prompt from the financial institution. We therefore refer to this as a "two-stage method", in which the user does not confirm the transaction itself, but confirms the prompt from the financial institution by means of an explicitly requested TAN. This method has also been found to have major weaknesses, as the user cannot identify who he is passing the data to, and the financial institution cannot identify if the data really are from their customer or are from an unknown attacker.

Developers quickly recognised the possibilities of the "two-stage method" and used it as a basis to develop further security methods that use a completely different communication channel for the "second stage". In the enhanced two-stage method, data originating from a server external to the fixed or mobile device (e.g. PC or smartphone) used to execute the transactions, are presented to the user on the display of an external chip-card reader. The data transmission occurs at the surface of the screen of the PC or smartphone via detectors in the external chip-card reader, which detect the flickering code (in future this may also be possible acoustically). Once the user has individually confirmed a set of data (account number, amount etc.), a TAN is computed using the customer's chip card in the chip-card reader. This computation is thus also external to the PC or smartphone. The TAN generated by the reader using the user's chip card and presented on its external display must then be transferred to the (web- or client-based) banking application environment explicitly by the user. The process is known as the chipTAN method.

The disadvantages of this method include the manual transfer of the transaction authentication number (TAN) by the user, the impracticality of using an additional device, the inconvenience of use in combination with smartphones, and the reduced amount of information shown and confirmed in the case of combined bank transfers.

Along with the chipTAN method, the prior art also includes the mTAN method (also called the SMS-TAN method). This is also a two-stage method. First, the user furnishes the bank with the user's mobile phone number. During a bank transaction, the user is sent an SMS text message containing a valid TAN. The user must then transfer this TAN while in the current session with the bank. Attacks via mobile-phone Trojans demonstrate that this method is also insecure, and we can expect the proliferation of such Trojans in future.

The method disclosed in patent DE 10 2008 007 367 B4 2010.09.30 also provides increased security. Based on the two-stage method, data originating from a server, independent of the PC on which the transaction is executed, are presented securely on a display and confirmed by the user. A further embodiment of this method involves generating a TAN in a secure environment using the chip card, and displaying it, and is similar to the ChipTAN or mTAN method.

In the context of applicable methods in the field of banking, the Secoder specification [1] should also be mentioned. In contrast to the previously mentioned methods, this specification also the possibility of implementation on the basis of the so-called "one-stage method". The Secoder specification defines a multifunctional IC card reader (chip-card reader) with display and keypad. Its functionality is specified by a set of commands that are executable within the chip-card reader by its own CPU. The significant aspects of the Secoder are, firstly, the use of an input/output unit trusted by the user, which guarantees the authenticity and integrity of the data, and secondly, the use of the "one-stage method" whereby the instructions/transaction data are firstly input locally by the user into the banking client, and, before they are transmitted to the bank server in one stage, they are externally confirmed and signed on a Secoder chip-card reader.

Chip-card readers are devices which control chip cards. Not only do they read data, but they also write data, or run applications on the chip-card. They are therefore also referred to as chip-card terminals [4]. There are four security classes for chip-card readers specified by the German banking industry (DK). Security Classes 1 and 2 are not of interest for any serious degree of security. Chip-card readers of Security Class 3 have a display and a keypad, as well as additional functions that enable bank-card payments over the internet. In addition to the features of Security Class 3, chip-card readers of Security Class 4 also have their own tamper-proof identity. This is made possible by an additional chip card. If a chip-card reader is connected to a PC via a USB or serial interface, it is recognised by proprietary or standardised software interfaces and can communicate with an application. The present standard for such interfaces is PC/SC [5], and implementations are available for Windows and Linux. The Secoder specification [1] exceeds the features of Security Class 3. A chip-card reader built according to this specification includes a firewall which protects against possible tampering while the device interacts with the user via a display and keypad (e.g. for PIN input), or processes data for the signing operation using a chip card.

Solutions are also conceivable using chip-cards of specific form factors (such as micro SD with integrated chip-card) in a smartphone with a BlackBerry or Android operating system. However, this would scarcely satisfy the requirements for increased security, as there would be no independent, secure input/output facility, and so it will not be given further consideration here.

It is expected that nearly all future smartphones will be Bluetooth-[2] and NFC-enabled [3], with certain restrictions. There are devices, such as the iPhone, which do not currently have integrated NFC interfaces. In such cases, an external accessory is available for communication with a chip card via a chip-card reader, or a different communication protocol can be employed. One possible such protocol is the Bluetooth standard.

These wireless interfaces create the conditions that allow, for example, a chip-card reader to be connected to a PC or smartphone without cables. The first chip-card readers of this type are already on the market. If a chip-card reader based on the Secoder standard [1] were to be used today in combination with a mobile device, then as things stand today, additional cabling would be necessary, the smartphone may need to be reconfigured and additional software would have to be installed, if this is even feasible on a commercially-available mobile device. Alternatively, such a chip-card readers would have to be converted to wireless communication—something that is at least technically feasible today. For example, a few commercially available chip-card readers implement this function via Bluetooth.

The prior art also includes the integration of a display and a (generally) numeric keypad directly onto an ID-1-sized chip-card according to ISO 7810. Such chip-cards are only used today in "one-time password" and "challenge-response" authentication methods.

NFC Technology http://de.wikipedia.org/wiki/Near_Field_Communication
(Wikipedia): Near field communication (NFC) is an international transmission standard for contactless exchange of data over short distances of up to 4 cm. The transmission is either connectionless (using passive HF-RFID tags according to ISO 14443 or ISO 15693), or connection-bound (between two equivalent active transmitters). So far, this technology has mainly been used in micropayment solutions (cashless payments of small amounts). In Germany, for example, the technology is offered by savings banks for payments of up to 20 euros, and used by Deutsche Bahn in their Touch&Travel system. It is expected that nearly all future smartphones will be NFC-enabled.

Bluetooth (Latest Version: 4.0)
http://de.wikipedia.org/wiki/Bluetooth#Aktueller_Standard:_Bluetooth_4.0
(Wikipedia): Specification version 4.0 was adopted on 17 Dec. 2009. The standard introduced the low-energy protocol stack for the first time [1] and since then, new low-energy profiles have been continuously added. Compatible chips were available in small quantities from Q4 of 2010, with indications that mobile telephones equipped with Bluetooth 4.0 would be expected by Q1 of 2011. By June 2011, chips meeting the Bluetooth 4.0 standard were available from Atheros, CSR, Nordic Semiconductor [2], Texas Instruments and Toshiba.

OVERVIEW OF EMBODIMENTS

In particular, the invention relates to a chip card for electronic transactions including a display, a keypad, a network interface, a processing unit, a cryptographic microcontroller and a memory area for signature information and/or key information, characterised by a means which enables the chip card to connect to a host system via the network interface so as to appear to the host system as an integrated card reader with inserted chip card, whereby the transaction data relating to the chip card are received by the host system via the network interface for presentation on the display, so that the transaction data can be confirmed by key input on the keypad, provided with the signature, and then sent to the host system. In an advantageous embodiment, the chip card is connected to the host system via the card's network interface, and notifies the host system of what device it is, depending on the type of communication. If the communication connection is via Bluetooth, the processor of the chip card presents a standard chip-card reader with inserted chip card, which are available to the host system via the network interface. The device driver of the host therefore recognises a valid chip-card reader and initialises the connection accordingly. If the communication is via NFC, the connection is established in one of the applicable and specified NFC modes. If the NFC interface of the host system is an NFC chip-card reader, then the NFC module of the chip card establishes the connection with the NFC chip-card reader of the host system and presents a chip card (NFC mode "card emulation"). If the NFC interface of the host system is an NFC chip card, then the NFC module of the chip card establishes the connection with the NFC chip-card of the host system and presents an NFC chip-card reader (NFC mode "read/write"). There is also the peer-to-peer mode in which both sides (network interface of the host system and NFC interface of the chip card) behave as communication entities with equality of access, where one transmits and the other receives. All three NFC communication connections provide a pure transmission link for transaction data that are presented on the device's display in a tamper-proof manner, confirmed via the device's keypad in a tamper-proof manner, and signed in the cryptographic microcontroller using the signature information. Regardless of the type of chip-card reader that is initialised and recognised in the host system after the network connection has been established, all security-related applications in the host system are also informed that a chip card can be accessed via a valid chip-card reader with display and keypad. In the case of Bluetooth, this is done via the installed chip-card reader driver for the device. In the case of NFC card emulation, this occurs via the NFC chip-card reader driver in the host system, whereby the host system's application first provides the commands for the device's chip-card reader in the form of data within commands for the device's smart card, which are in turn transferred from the device's NFC card emulation to the device's processing unit where they are duly executed. Similarly, commands for the device's chip-card reader will also be packaged if (in the case of Bluetooth) the pre-installed or generic chip-card reader drivers in the host system are not capable of recognising the device's chip-card reader functions. For the other types of communication connection, there are special cases which are described below. The tamper-proof display of data, the secure use of the keypad, and the signature process—all without external intervention into the device—can be performed in a similar way to the firewall technology of the Secoder chip-card reader [1].

In a further embodiment, the chip card is defined as having physical dimensions according to a chip-card standard, in particular ISO 7810, preferably ID-1. The chip card preferably has the form factor used specifically by financial institutions for plastic cards incorporating an integrated circuit (chip).

In a further embodiment, the chip card is characterised by physical contacts and circuits which enable it to operate in standard card readers to execute a transaction. This adaptation enables the card to be used even if the host system does not permit a connection via the device's network interface. The physical contacts are the typical gold contacts of the chip-card module, or magnetic strips, so that the chip card can be used in conventional card readers or terminals.

In a further embodiment, the chip card is characterised by a secure memory area which is preferably managed by a cryptographic microcontroller or which is integrated in a cryptographic microcontroller. Microcontrollers for cryptographic operations are already manufactured to use secure memory modules, which are usually integrated and their contents managed. Such microcontrollers are considered very trustworthy. They execute applications and cryptographic operations within their specific operating system environment.

In a further embodiment, signature information and key material, in particular signature keys, are stored in the memory area for signing the transaction data, checking the identity of the user of the chip card, or proving the identity of the chip-card reader to an application on the host system. The key/signature material, which is usually stored in the memory area when the chip card is issued, or subsequently, is used by the cryptographic microcontroller to sign the displayed transaction data that are confirmed via the keypad. With the possibility of securely entering a personal identification number via the device's keypad, and it being verified by the cryptographic microcontroller, the user of the chip card can be identified. Lastly, it is also possible to check the identity of the chip-card reader or individual modules, if an application requires this.

In a further embodiment, the chip card is characterised by a keypad, in particular a membrane keypad or touch-sensitive screen, which is adapted to have the physical dimensions defined by a chip-card standard, whereby the number and mix of alphanumeric or other key symbols or their sizes are defined for the particular field of application, for example, for secure online banking using a Secoder chip-card reader according to the Secoder specification.

In another embodiment, the smart card is characterised by an integrated flat screen which is adapted to have the physical dimensions defined by a chip-card standard, whereby the display size is defined for the particular field of application, for example, for secure online banking using a Secoder chip-card reader according to the Secoder specification.

In a further embodiment, the host system is a point of sale system, a PC system, smartphone, cash machine or payment terminal. In all these computer systems, it is necessary or even mandatory to run security-related applications which, for a high level of security, require a chip card via a connected chip-card reader.

In a further embodiment, the chip card is adapted such that, depending on the network connection, it appears to the host system as a chip-card reader, or appears as a chip card while the communication connection with the host system is being established, but appears to an application on the host system as a chip-card reader with inserted chip card. It is possible to use the device's keypad and display to define or configure which communication connections are allowed or enabled via the device's network interface. As explained above, in each communication connection it is always possible for the device to achieve the objective of using the chip-card functions with the integrated, trusted chip-card reader functions.

In a further embodiment, the data input by the user on the screen of the host system are re-displayed to the user to ascertain their authenticity, and the user is able to explicitly confirm them. While a transaction is being prepared by means of an application on the host system, the user is prompted to enter data. To ensure that the data that are subsequently used have not been tampered with, they are sent to the chip card to be signed. Before being signed, they are displayed to the user once again. The device's display and keypad are both trusted because the device is using known processes, such as a firewall. Similar mechanisms are in use today, for example when using a Secoder chip-card reader with a chip card inserted.

In a further embodiment, the chip card signs the data using key material so that the data can only be meaningfully and effectively used by a specific recipient of the signed data. This enables the implementation of asymmetric or symmetric cryptographic systems which ensure that, when key material is created and distributed, the processed data can only be meaningfully and effectively used by those entities (persons or machines) that possess the correct key components.

In a further embodiment, further applications are run in the processing unit, including a functional part of one or more ranges of applications such as home banking, mobile banking or online banking, as well as functional blocks from the range of applications comprising VPN client, email client, electronic passports and ID cards, or time registration and door access, where the user is expected to use his chip card for authentication purposes or electronic signatures. Several applications can run in the device's processing unit, as defined by the particular field of use. The field of use and the application running on the processing unit define what information is displayed to the user during the transaction.

In a further embodiment, the chip card includes several cryptographic microcontrollers and/or several types of chip-card reader are emulated. This is necessary to support as broad a range of applications as possible. Such an embodiment could be implemented by the processing unit connected upstream, since it can control which cryptographic microcontroller is required and/or what type of chip-card reader needs to be simulated, depending on the application and the host system.

Furthermore, it is preferable that an energy source is provided to supply power, and the energy source can be recharged by NFC induction or may be a solar module. Different applications on the chip card and different cryptographic operations or display actions have different power requirements. While it is possible to obtain electric power by NFC induction, this is not adequate for all cases. Considering its power requirements, the device needs a rechargeable energy source so that it can be used for as long as possible. This is the case if it is charged by NFC induction or is a solar module.

DETAILED DESCRIPTION

The present invention relates to an apparatus and a method.

It is the main objective of the apparatus of the present invention to realise the security functions of a commercially-available chip card and those of a commercially-available chip-card reader [5], while satisfying strict security requirements relating to the trusted display, input or confirmation of transaction data, in compliance with, for example, the Secoder principle of the German banking industry [1]. Of course, the apparatus can execute its functions individually or in part. Thus, the apparatus of the present invention can also operate solely as a chip card, or alternatively as a chip card with an integrated chip-card reader, whereby the chip-card reader does not necessarily need to meet the high security requirements in respect of a trusted input/output unit, or only requires such a unit for secure input of a PIN, for example.

The objective of the invention is to employ a single additional device in the form of an ISO-ID1 chip card (similar to a current credit card) to endow security-critical applications in terminal environments, such as PCs, POS machines, cash machines or other payment terminals, and especially the rapidly growing world of smartphones and tablet-PCs, with the high security level of a chip card through the use of an integrated chip-card reader with a trusted display/keypad unit for all important security operations.

The apparatus of the invention is a chip card having the physical dimensions ID-1 as defined by ISO 7810, which not only furnishes the cryptographic functions of a cryptographic microcontroller, for example for digital signatures, but also provides the functions of a chip-card reader. The apparatus also includes a trusted display/keypad unit and has built-in NFC and Bluetooth functionality which allow wireless communication with modern mobile devices such as smartphones or tablets, as well as with PCs or payment terminals. As such, the apparatus meets all requirements for a good level of acceptance by potential users, since it combines the latest state-of-the-art security (chip card and chip-card reader of at least Security Class 3) with ease of use, it can communicate optimally with modern mobile terminals, while remaining backwardly compatible (for example the gold contact pads of the chip card module can still be used), and also saves on the high cost of expensive chip-card readers.

Figure 1:
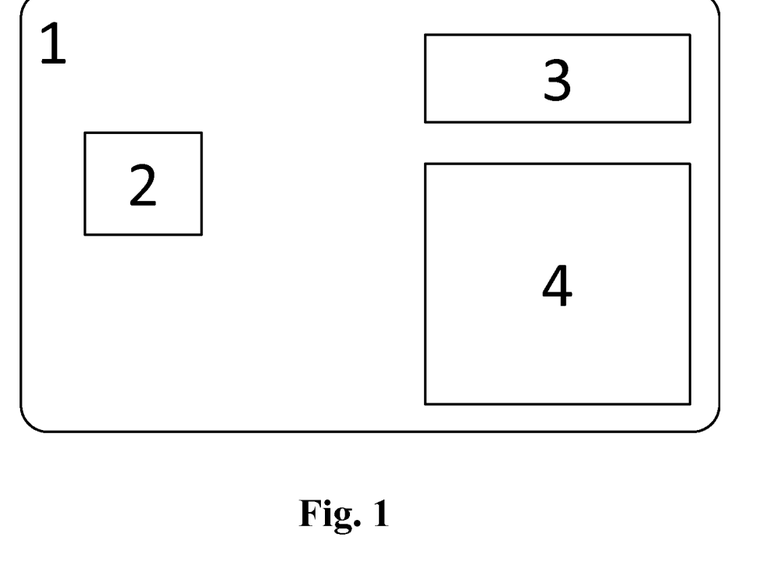
FIG. 1 shows the apparatus of the present invention from a user's perspective.

The apparatus of the present invention combines the important functions of a chip-card reader with a chip card within the format of an ISO chip card having physical dimensions ID-1 as defined by ISO 7810 [FIG. 1, numeral 1]. Visible to the user are the typical gold contact pads of the chip-card module of a chip card [FIG. 1, numeral 2], a keypad [FIG. 1, numeral 4] and a display unit [FIG. 1, numeral 3] for trusted input and output. I another possible embodiments the card implements one or more of the following standards the ISO 7810, ISO 7816, PCSC Standard, ISO 14443.

Figure 2:
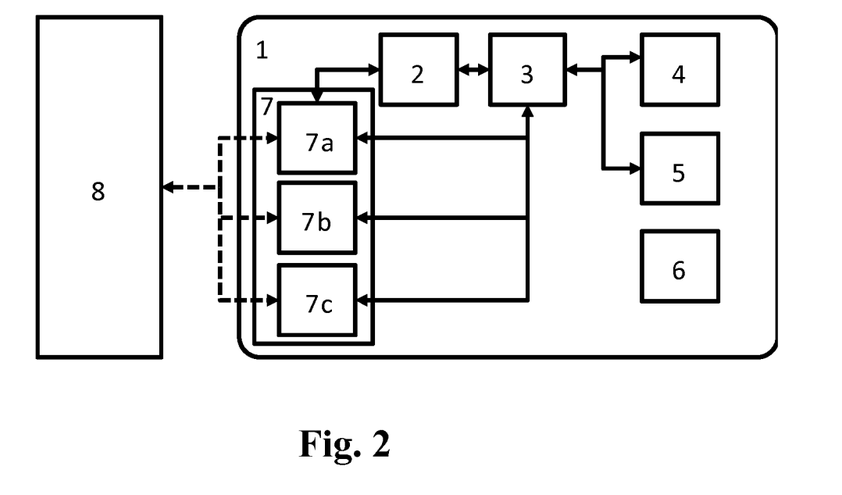
FIG. 2 shows the layout of the apparatus of the present invention.

FIG. 2 shows an overall view of an ISO ID1 chip card 1. The cryptographic microcontroller 2 is a fully-functional processor chip card with cryptographic capabilities. The apparatus of the invention may have several of these chip-card elements. Also provided is a central processing unit (CPU) 3, which performs the processing. Transaction details are displayed on the display unit 4 in a tamper-proof manner. The keypad unit 5 is used by the user to enter data, particularly PINs. An energy source 6 (if required e.g. for Bluetooth) is provided to power the unit. The energy source can be recharged via NFC, or may be a solar module. The network interface(s) (7a, 7b, 7c) are used for communication. The apparatus of the invention includes at least one network interface. In terms of current technology, this may be implemented using NFC 7a or Bluetooth 7b, or some other contactless technology 7c such as Wireless USB.

Figure 3A:
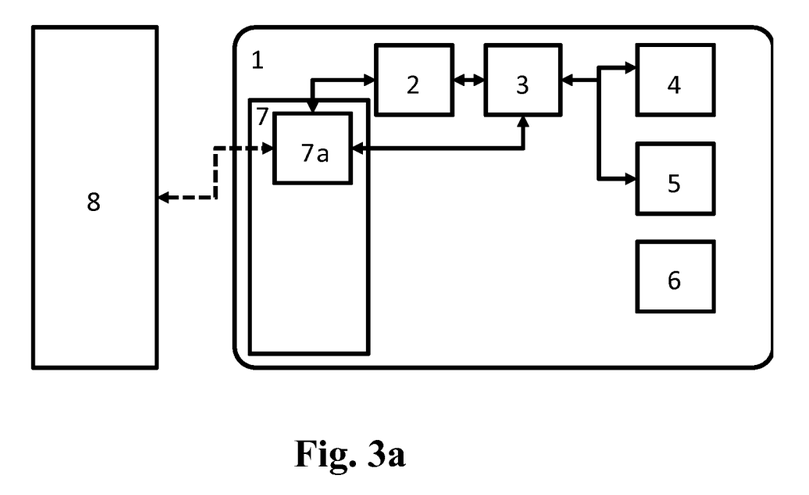
FIG. 3a shows an embodiment in which the network interface is implemented on the basis of NFC.
Figure 3B:
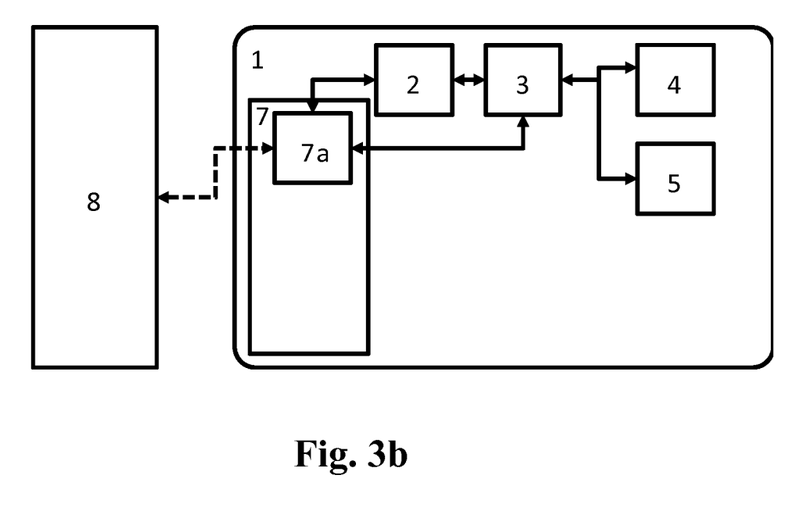
FIG. 3b shows an embodiment in which the network interface is implemented on the basis of NFC. The apparatus does not include an energy source.

In the case of an NFC interface, the NFC module may also be directly connected to one of the cryptographic microcontrollers of the apparatus. Alternatively, the apparatus may include a cryptographic microcontroller with integrated NFC functionality.

Also required is a host system 8 with a security-critical application that needs a chip card to secure its transactions.

The host system may be a conventional PC (Windows, LINUX), a smartphone or tablet PC (iPhone, Android, Windows Phone 7, BlackBerry 10 etc.), or a modern point of sale system, cash machine or payment terminal.

With built-in NFC functionality 7a, the apparatus of the invention can be used in all modes that have been defined and standardised for NFC. These are "card emulation" (taking the role of a chip card), "read/write" (taking the role of a chip-card reader), and "peer-to-peer" (active communication unit with equality of access for data exchange).

The "card emulation" mode will be explained first. The present invention focuses on applications that run on a host system 8 and require the use of a chip card. Such applications may be home banking, mobile banking or online banking applications, as well as VPN clients or email clients, which expect the user to use his chip card for authentication purposes or electronic signatures. Whenever the apparatus of the invention is to be used with such applications, and the applications are running on NFC-enabled terminals or host systems 8 (such as Android smartphones or tablets), then, in the case of "card emulation", the apparatus takes on the role of a chip card vis-a-vis the host system 8. The host system 8 may also be a PC equipped with an external or built-in NFC-enabled chip-card reader. Thus, in terms of NFC, the host system 8 is the chip-card reader, and the apparatus of this invention (operating in "card emulation" mode) is the chip card. When the coupling of these two devices occurs, this communication connection is used purely for data transmission. In general, an application uses the device drivers of a chip-card reader, either directly or indirectly, to reach the connected chip card. Such device drivers are either preinstalled or have to be installed on the host system. It is the objective of the apparatus of the invention, which also includes a chip-card reader to be used in the method of the invention, to bypass the existing, upstream NFC chip-card reader of the host system (external or integrated). For a high level of security, the application will generally not only transmit chip-card commands, but also commands that relate to both the chip-card reader and the chip card, or commands only for the chip card. Firstly, commands to use a display or a keypad on a chip-card reader that does not have display or keypad would be of no use. Secondly, the upstream NFC chip-card reader would do no more than ignore or reject such commands. This aim can be achieved by addressing specific chip-card commands to the chip card (cryptographic microcontroller 2) via the application or indirectly via additional intermediate software. A similar method is used in present-day chip-card readers based on the Secoder specification. While the Secoder chip-card reader connected in the normal manner via USB to the PC will be recognised by the PC as a USB device, the standard PC device drivers installed (PC/SC) will not necessarily know that it could be a Secoder chip-card reader. However, because the security-related application on the PC is only permitted to communicate with a Secoder chip-card reader and a chip card that is inserted into a Secoder chip-card reader, the application takes on the task of issuing the commands for the chip-card reader by means of chip-card commands in the form of data. From the received command, the upstream chip-card reader of the host system recognises that the command is addressed to the chip card, and duly forwards it to the coupled chip card (the apparatus of the invention in "card emulation" mode) for processing. The coupled apparatus of the invention is in NFC "card emulation" mode, and receives these commands. The CPU 3 of the apparatus of the invention is able to recognise, interpret and execute them as chip-card reader commands. In general, a chip-card reader with special requirements first displays data to the user on a trusted display, has the user confirm the data by means of a keypad, and then has the data signed using a cryptographic microcontroller 2. Subsequently, the signed data are returned to the application in the form of a response. Firstly, the CPU 3 of the apparatus prepares the response (or result of an executed chip-card command) and then transfers it to the chip-card reader of the host system, which, in turn, provides the data to the application via the device drivers. It is also quite possible for the application to send chip-card commands that are not intended for the chip-card reader of the apparatus. In this case, the command with the data is forwarded to the chip card, or more specifically, to the cryptographic microcontroller 2 of the apparatus of the invention, where it is duly executed. The result of this operation is firstly received by the CPU 3, which forwards it appropriately via the communication interface to the host system. As described above, the data are then available to the application.

The other NFC modes are also conceivable, depending on the use scenario. For example, the peer-to-peer mode can be used for a software update of the apparatus. If the apparatus of the invention is set to NFC read/write mode, i.e. the apparatus takes on the role of a chip-card reader, then not only is it possible to use the apparatus of the invention contactlessly with a PC, but it can also be used with a different contactless smart card/chip card. The latter may be either a real ISO chip card (such as a bank card), or a chip card/smart card in the form of an NFC card emulation, such as a further NFC-enabled Android smartphone behaving as a chip card (i.e. in NFC card emulation mode). In this case, the smartphone, i.e. the host system 8, is connected to the apparatus of the invention, which masquerades as a chip-card reader vis-a-vis the host system 8. In this scenario, one of the cryptographic microcontrollers 2 in the apparatus of the invention can turn the apparatus of the invention into a chip-card reader of Security Class 4.

The mode the apparatus of the invention should assume, or the network interface it should use to connect can be preset by the user on the apparatus, or can be set via the keypad after switch-on, or, where possible, the apparatus will automatically recognise the appropriate communication protocol or the correct NFC mode.

Figure 3C:
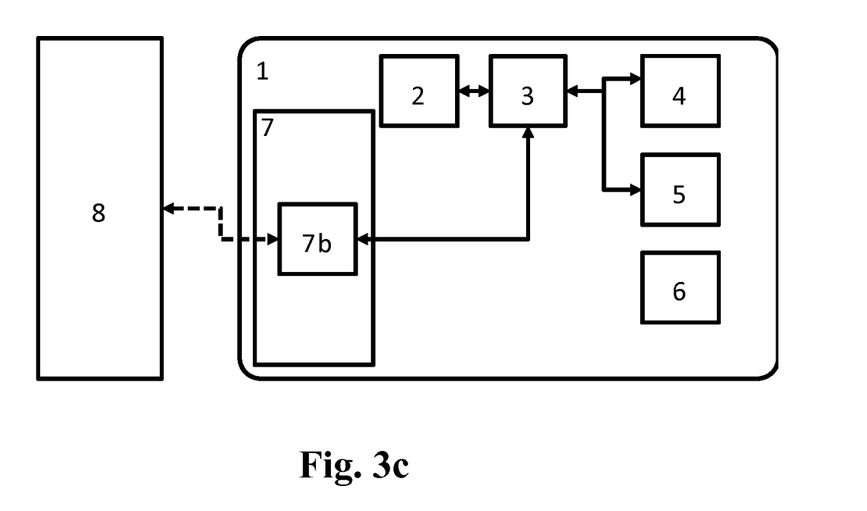
FIG. 3c shows an embodiment in which the network interface is Bluetooth-based.
Figure 3D:
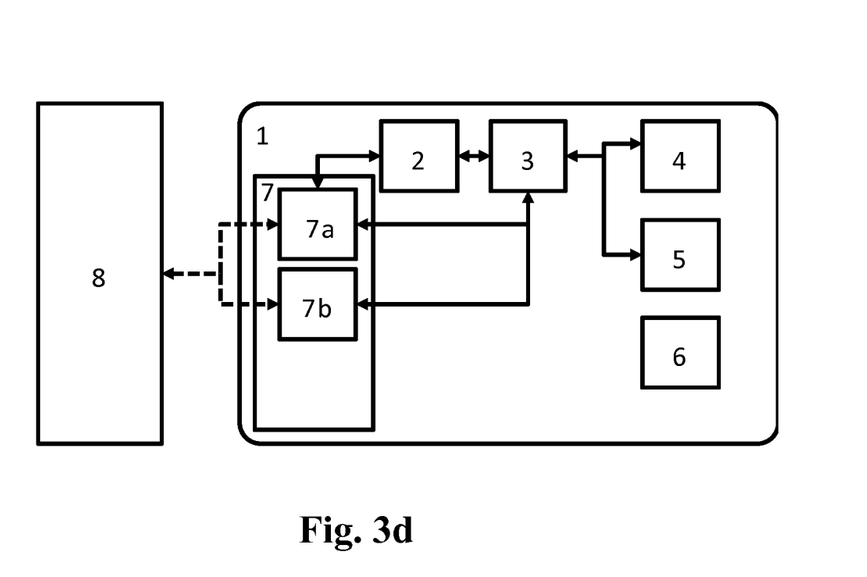
FIG. 3d shows an embodiment including one Bluetooth-based network interface and one NFC-based network interface.

If the apparatus of the invention communicates externally with a host system 8 via the Bluetooth standard 7b, then it will be recognised as a fully-functional chip-card reader by the host system, or with the help of additional driver software on the host system. In this scenario, the chip card or smart card used is the chip card integrated in the apparatus/in the cryptographic microcontroller 2. In general, as is usual within the Bluetooth standard, both devices are paired or have to be coupled in conformance with the standard. Via this communication interface, the apparatus in accordance with this invention presents itself to the host system 8 as a standard chip-card reader (also in conformance with the standard). The chip-card reader is recognised either via the device drivers (PC/SC) preinstalled on the host system, or via drivers that may have been subsequently installed on the host system, should this be possible. Information indicating that a chip-card reader is connected to the host system is normally available to any application that requires a chip card, as it is a standard chip-card reader from the perspective of the host system.

The CPU 3 integrated in the apparatus of the invention creates the conditions for executing program code for implementing specific procedures and algorithms to control the entire secure environment, including the input/output units. Use scenarios would be business operations and transactions that an application on a host system controls or executes, where the application expects a chip card to be connected to the host system for secure signing of data. Depending on the field of use, it is possible to run several specific applications on the CPU 3 of the apparatus of the invention, which are capable of using the features of the whole apparatus. These applications can be preinstalled or installed subsequently. As such, the apparatus of the invention and its method can also be employed in several fields of use without effort on the part of the user.

Figure 4:
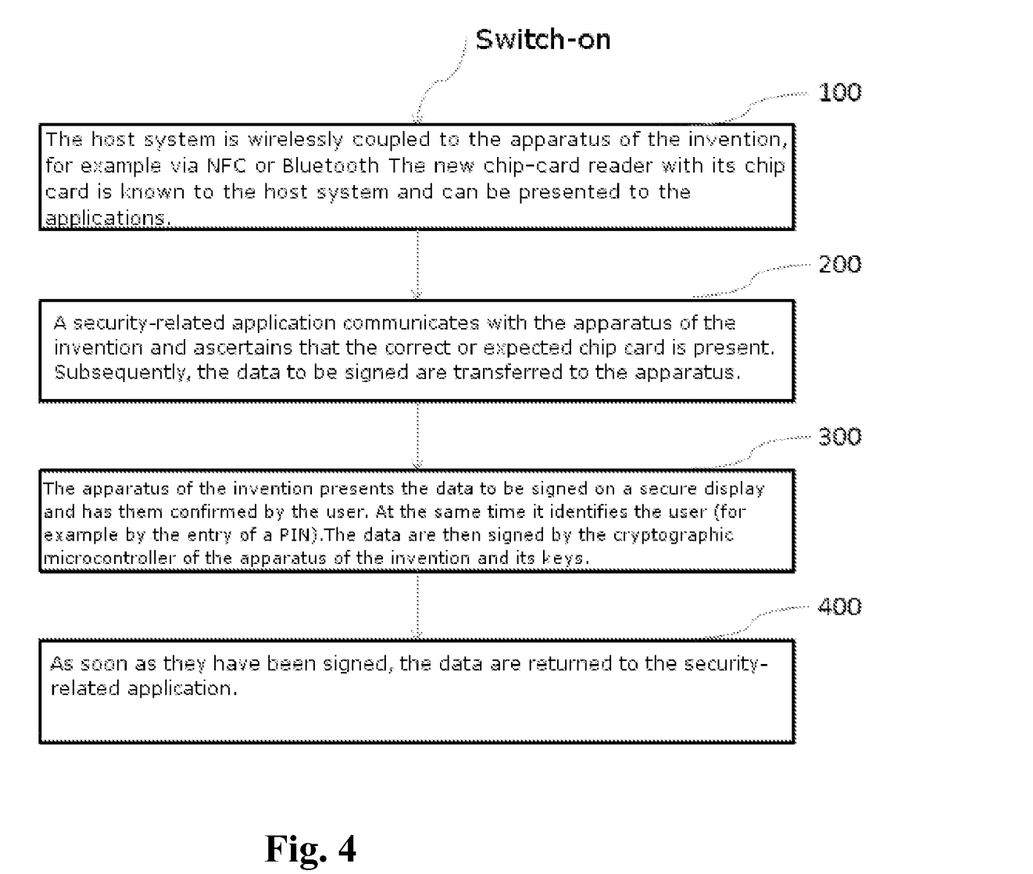
FIG. 4 provides a brief description of the method of the invention.

FIG. 4 shows the four steps of the method according to the invention. Starting at Step 100, the wireless coupling between the host system and the apparatus of the invention is established. At Step 200, the transaction data to be signed are transferred to the apparatus of the invention. At Step 300, the data are re-displayed, confirmed by the user via the keypad and signed. At Step 400, the signed data are transferred back to the host system. The four steps of the method will now be described in more detail.

In the first step 100 of the method of the invention, preferably based on the aforementioned apparatus, the apparatus of the invention is connected (for example via NFC or Bluetooth) to a host system (PC, smartphone, point of sale or cash machine, or other payment terminal), which is capable of executing an application to control transactions. The transactions are generally financial transactions such as cashless payments or transfers of money. Such host systems are normally connected to a background system of a bank or some other server, the background system or server being capable of accepting and processing the transaction data. Independent of the facilities of the respective operating system environment, program information specific to the apparatus of the invention have been stored in advance on the PC, smartphone or payment station, or suitable drivers have been installed. It is assumed that NFC or Bluetooth network interfaces are enabled on the host system, and the standard recognition mechanism for external chip-card readers is enabled.

From the perspective of achieving the objecting of the present invention, it is irrelevant whether the communication between the host system and the apparatus of the invention is established via Bluetooth or NFC, or whether the host system already has a connected external chip-card reader or integrated chip-card reader. Even if the apparatus of the invention is used, for example, via NFC as an external chip card (card emulation), the chip-card reader of the apparatus of the invention can still be used, if required, instead of the chip-card reader of the host system, since clearly only this is considered trusted, and not, for example, the environment of an Android smartphone.

In the second step 200 of the method of the invention, when a transaction is being executed, for example within a banking application—irrespective of whether this is a browser-based web application or is installed on the host system as a client application—the data (e.g. amount transferred, payee's account) input by the user via the screen of the host system are re-displayed to the user in the secure environment of the apparatus of the invention so that their authenticity can be ascertained, and the data are explicitly confirmed by the user here. More specifically, the data are firstly prepared in a suitable manner by the application. They are then transferred to the/an apparatus of the invention via program components provided for this purpose. In the third step 300 of the method, the data are displayed in a tamper-proof manner on the trusted display unit 4, confirmed by the user via the secure keypad unit 5, and signed using the key material contained in the chip card and uniquely assigned to the respective user, the key material being securely stored in the cryptographic microcontroller 2. This sequence of operations is known or standardised. The application communicates with the expected chip card, which has been inserted into an expected secure chip-card reader. This the case, even if the actual contactless data transmission takes place on the basis of some other existing insecure chip-card reader, as in the case of NFC. In the fourth and final step 400 of the method of the invention, the signed data in the apparatus of the invention are then received by the application on the host system, which may then transfer them to a designated recipient. Depending on the business operation, all or part of this sequence can be repeated several times during a transaction or session. The apparatus of the invention is also suitable for encryption operations, since it is possible for the key memory to additionally store keys for encrypting the data.

The method and apparatus of the invention meet the highest security requirements. The PIN input by the owner of the chip card is carried out as required or on request, depending on the transaction, using the secure apparatus of the invention and is verified independent of any of the potential risks of a host system. The data to be signed are visualised on a secure display that is outside and free from the possibilities of tampering, and then confirmed by the user. The fact that the data of the apparatus of the invention originate from an at-risk environment, such as that of a host system, is no longer critical. The data that have been signed using the key material on the chip card can only be meaningfully and effectively used by a specific recipient of the signed data. This is explained by the cryptographic systems employed. In order to sign data, asymmetric or symmetric cryptographic systems use keys, which are generally stored in the cryptographic microcontroller 2 of the chip card of the present invention. The keys never leave the cryptographic microcontroller and the secure memory thereof, and cannot be attained or otherwise accessed by the host system. Each cryptographic signing operation requires a "counter operation". For example, if a signature is generated in the cryptographic microcontroller 2 of the chip card of the present invention based on an asymmetric cryptographic system, then this would use a private key of the chip card. The verification of this key takes place at the specific recipient of a message signed in this way. A symmetric cryptographic system is used in a similar way. As a rule, the user and recipient can hold the secret key that was used to sign a message.

A first advantage of the arrangement and method of the invention is that modern mobile devices with their built-in contactless communication interfaces (Bluetooth, NFC) can be optimally used to provide the user with the highest levels of security, ease of use and comfort. Secondly, it is expected that great cost savings will be achieved for the issuers (e.g. financial institutions) through the elimination of individual chip-card readers. Further advantages include the high degree of backward-compatibility of the apparatus of the invention, as it can be used as a conventional ISO chip card. Of course a magnetic strip can also be applied to the back of the apparatus. Furthermore, for reasons of trustworthiness, it is not advisable to use chip-card readers built into smartphones, for example.

Based on the foregoing specification, embodiments may be implemented using computer programming or engineering techniques including computer software, firmware, hardware or any combination or subset thereof. Any such resulting program—having computer-readable code—may be embodied or provided in one or more computer-readable media, thereby making a computer program product (i.e., an article of manufacture) implementation of one or more embodiments described herein. The computer readable media may be, for instance, a fixed drive (e.g., a hard drive), diskette, optical disk, magnetic tape, semiconductor memory such as for example, read-only memory (ROM), flash-type memory, etc. An article of manufacture containing the computer code may be made and/or used by executing the code directly from one medium, by copying the code from one medium to another medium, and/or by transmitting the code over a network. In addition, one of ordinary skill in the art of computer science may be able to combine the software created as described with appropriate general purpose or special purpose computer hardware to create a computer system or computer sub-system embodying embodiments or portions thereof described herein.

While various embodiments have been described, they have been presented by way of example only, and not limitation. Thus, the breadth and scope of any embodiment should not be limited by any of the above-described exemplary embodiments, but should be defined only in accordance with the following claims and their equivalents.

REFERENCES

[1] Deutsche Kreditwirtschaft (DK) Secoder, Connected mode, Reader Applications", Version 2.2
[2] Wikipedia, Bluetooth, http://de.wikipedia.org/wiki/Bluetooth#Aktueller_Standard:_Bluetooth_4.0
[3] Wikipedia, NFC, http://de.wikipedia.org/wiki/Near_Field_Communication
[4] Wikipedia, Chipkartenleser, Kartenlese Chip-Kartenlesergerät, http://de.wikipedia.org/wiki/Kartenleseger%C3%A4
[5] Wikipedia, PC/SC Workgroup, www.pcscworkgroup.com/
[6] ISO 7810, ISO 7816, PCSC Standard, ISO 14443

What is claimed:

1. Chip card for an electronic transaction including a display, a keypad, a network interface, a processing unit, a microcontroller and a memory area for signature information or key information,
    comprising a processor which enables the chip card to connect to a host system via the network interface so as to appear to the host system as an integrated card reader with inserted chip card, whereby the transaction data relating to the chip card are received by the host system via the network interface for presentation on the display so that the transaction data can be confirmed by key input on the keypad, provided with the signature, and then sent to the host system;
    comprising physical contacts and circuits which enable it to operate in standard card readers to execute a transaction.

2. Chip card according to claim 1, having physical dimensions according to a chip-card standard, in particular ISO 7810, preferably ID-1.

3. Chip card according to claim 1, comprising a secure memory area which is preferably managed by a cryptographic microcontroller or which is integrated in a cryptographic microcontroller.

4. Chip card according to claim 3, wherein signature information and key material, in particular signature keys, are stored in the memory area for signing the transaction data, checking the identity of the user of the chip card, or proving the identity of the chip-card reader to an application on the host system.

5. Chip card according to claim 1, comprising a keypad, in particular a membrane keypad or touch-sensitive screen, which is adapted to have the physical dimensions defined by a chip-card standard.

6. Chip card according to claim 1, comprising integrated flat screen which is adapted to comply with the physical dimensions defined by a chip-card standard.

7. Chip card according to claim 1, wherein the host system is a point of sale system, a PC system, smartphone, cash machine or payment terminal.

8. Chip card according to claim 1, adapted such that, depending on the network connection, it appears to the host system as a chip-card reader, or appears as a chip card while the communication connection with the host system is being established, but appears to an application on the host system as a chip-card reader with inserted chip card.

9. Chip card according to claim 1, wherein the data input by the user to the screen of the host system can be re-displayed to the user to ascertain their authenticity, and the user is able to explicitly confirm them here.

10. Chip card Chip card according to claim 1, wherein the data signed using key material can only be meaningfully and effectively used by a specific recipient of the signed data.

11. Chip card according to claim 1, wherein further applications are run in the processing unit, including a functional part of one or more fields of use such as home banking, mobile banking or online banking, as well as functional blocks from the fields of use comprising VPN client, email client, electronic passports and ID cards, or time registration and door access, where the user is required to insert his chip card for authentication purposes or electronic signatures.

12. Chip card according to claim 1, wherein one or more cryptographic microcontrollers are included or several types of chip-card readers are emulated.

13. Chip card according to claim 1, wherein an energy source is provided for supplying power, and can be charged up by NFC induction, or by a solar module.

14. Chip card according to claim 1, implementing one or more of the following standards: ISO 7810, ISO 7816, PCSC Standard, ISO 14443.

* * * * *